J. H. KAUFMAN.
HINGE.
APPLICATION FILED JUNE 15, 1909.
933,648.
Patented Sept. 7, 1909.
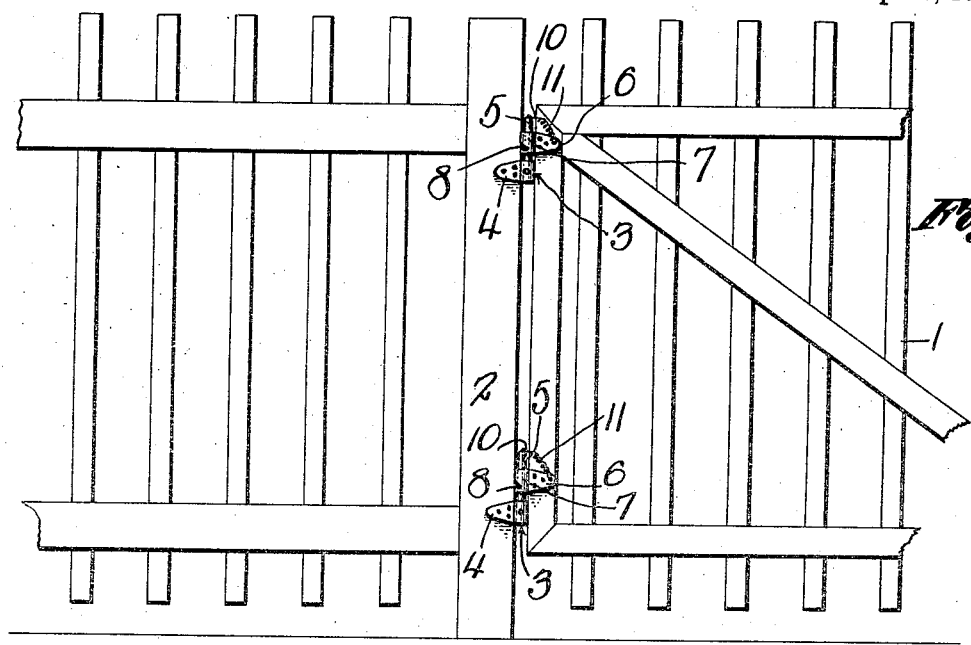
Fig. 1.
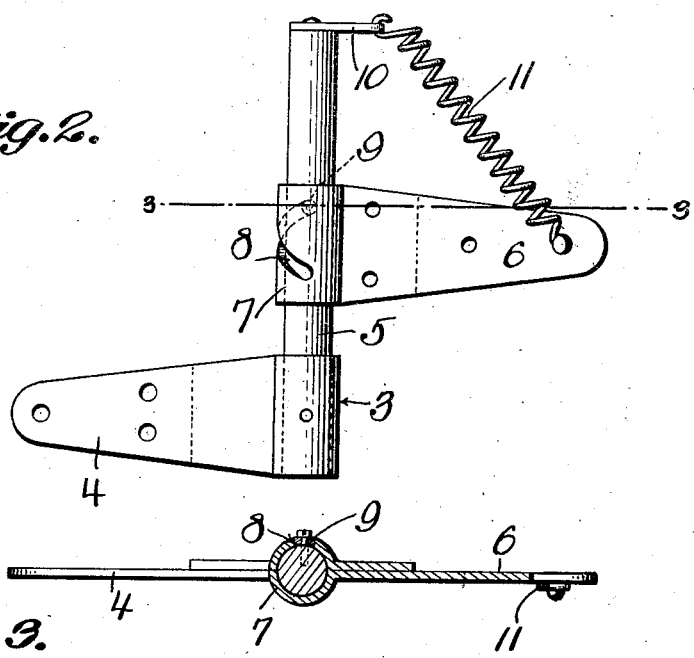
Fig. 2.
Fig. 3.
Witnesses
Chas. Richardson
Wm. J. North
Inventor
Joseph H. Kaufman,
By Victor J. Evans
Attorney

UNITED STATES PATENT OFFICE.

JOSEPH H. KAUFMAN, OF ELMORE, MINNESOTA.

HINGE.

933,648.  Specification of Letters Patent.  Patented Sept. 7, 1909.

Application filed June 15, 1909. Serial No. 502,304.

*To all whom it may concern:*

Be it known that I, JOSEPH H. KAUFMAN, a citizen of the United States, residing at Elmore, in the county of Faribault and State of Minnesota, have invented new and useful Improvements in Hinges, of which the following is a specification.

This invention relates to hinges and the device is primarily directed to that class of hinges employed in connection with gates, the object of the invention being to provide a device of this character whereby a gate is raised when opened and whereby the gate is adapted to be normally closed by its own weight.

Another object of the invention is to provide a gate hinge of this character having a resilient element adapted to assist in the opening of the gate as well as act as a buffer to prevent the slamming of the gate when the latter is closed.

With the above and other objects in view, which will appear as the description progresses, the invention resides in the novel construction and arrangement of parts hereinafter fully described and claimed.

In the accompanying drawing, Figure 1 illustrates the improvement in applied position. Fig. 2 is an enlarged side elevation of the hinge detached. Fig. 3 is a horizontal sectional view upon the line 3—3 of Fig. 2.

In the accompanying drawings the numeral 1 designates an ordinary gate and 2 the post therefor.

The numeral 3 designates the improved gate hinge. This hinge comprises a lower butt 4 to which is rigidly secured a vertical upstanding pintle 5.

The numeral 6 designates the sliding butt of the hinge. This butt 6 has its inner end provided with a knuckle 7 whereby the same is positioned upon the pintle 5 of the butt 4. The knuckle 7 is provided with an arcuate cut away portion 8 which extends from its lower edge in a curved direction to a sufficient distance away from its upper edge to allow the said butt 6 to occupy an alining position with the butt 4, which is secured to the gate post 2. The pintle 5 is provided with a suitable roller 9, which is adapted to bear against the walls formed by the arcuate cut away portion 8 of the collar 7. The pintle 5 is adapted to extend a suitable distance above the butt 6 and is adapted to have its upper extremity provided with a loosely connected link 10. This link 10 has its outer extremity provided with a suitable perforation, whereby one of the end convolutions of a helical spring 11 may be readily attached, while the opposite end convolution of the spring is secured to the outer portion of the butt 6. By this arrangement it will be noted that the spring 11 exerts its utmost tension when the gate 1 is closed and it is to be understood that the butt 6 is secured to the gate 1, and it will be further noted that the spring 11 exerting this pressure will have a tendency to assist in opening the gate. It will be still further noted that as the gate is closed the said spring 11 has a tendency to prevent the slamming of the gate, thus allowing the same to close quietly and without noise.

It is to be understood that the gate 1 is of a sufficient weight to overcome the tension of the spring 11, thus allowing the said spring to effectively perform the purpose for which it is intended.

From the above description, taken in connection with the accompanying drawing it will be noted that I have provided a simple and effective hinge for the purpose intended, and while I have illustrated and described the preferred embodiment of the invention as it now appears to me, minor details of construction within the scope of the following claims may be resorted to if desired.

Having thus fully described the invention what is claimed as new is:

1. A hinge of the character described comprising a butt having an upwardly extending pintle, a sliding butt revolubly mounted upon the pintle and a resilient connection between the sliding butt and the pintle adapted to assist in the rotation of the butt to resist the downward sliding movement of the butt.

2. In combination with a gate and a post therefor, of a hinge, said hinge being provided with a butt adapted to be secured to the gate post, said butt having an upwardly projecting pintle, a sliding butt mounted upon the pintle, and secured to the gate, said butt having its portion mounted upon a pintle provided with an arcuate slot, a roller upon the pintle engaging the walls of this slot, a link loosely connected with the top of the pintle and a resilient member connecting the link and the movable butt.

In testimony whereof I affix my signature in presence of two witnesses.

JOSEPH H. KAUFMAN.

Witnesses:
 LOUIS PETTUS,
 HENRY F. CLAUDE.